United States Patent
Foster

(10) Patent No.: US 6,234,539 B1
(45) Date of Patent: May 22, 2001

(54) QUICK CONNECT SEALING AND CLAMPING APPARATUS AND METHOD

(76) Inventor: Richard Allen Foster, P.O. Box 141, Sulphur, LA (US) 70664

( * ) Notice: Subject to any disclaimer, the term of this patent is extended or adjusted under 35 U.S.C. 154(b) by 0 days.

(21) Appl. No.: 09/262,818

(22) Filed: Mar. 5, 1999

(51) Int. Cl.[7] .................................................. F16L 37/04
(52) U.S. Cl. ........................ 285/94; 285/338; 285/346; 184/15.1
(58) Field of Search .............................. 285/94, 338, 346, 285/216, 114; 184/15.1

(56) References Cited

U.S. PATENT DOCUMENTS

| | | | | |
|---|---|---|---|---|
| 1,005,123 | * | 10/1911 | Austin | 285/346 |
| 2,544,764 | * | 3/1951 | Parks | 285/346 |
| 2,681,711 | * | 6/1954 | Sievenpiper | 184/15.1 |
| 2,898,940 | * | 8/1959 | Cole, Jr. | 285/114 |
| 2,954,990 | * | 10/1960 | binns | 285/114 |
| 3,101,812 | * | 8/1963 | Mercer, Sr. | 184/15.1 |
| 3,738,688 | * | 6/1973 | Racine | 285/346 |
| 3,828,890 | | 8/1974 | Schott . | |
| 3,889,781 | | 6/1975 | Schott . | |
| 4,039,048 | * | 8/1977 | Safholm | 184/15.1 |
| 4,554,998 | | 11/1985 | Kenny . | |
| 4,834,719 | * | 5/1989 | Arenas | 604/243 |
| 5,107,961 | | 4/1992 | Schott . | |
| 5,222,577 | * | 6/1993 | Nelson | 184/15.1 |
| 5,226,898 | * | 7/1993 | Gross | 604/243 |
| 5,338,313 | * | 8/1994 | Mollenauer et al. | 604/249 |
| 5,992,899 | * | 11/1999 | Strowe | 285/338 |

* cited by examiner

Primary Examiner—Eric K. Nicholson
(74) Attorney, Agent, or Firm—Shaffer & Culbertson, LLP; J. Nevin Shaffer, Jr.

(57) ABSTRACT

A quick connect sealing and clamping apparatus and method having a pair of oppositely positioned sleeves (12) interconnected by a flexible coupling (14). The pair of oppositely positioned sleeves (12) includes a locking device (16) for locking the oppositely positioned sleeves (12) together when in position. The oppositely positioned sleeves (12) in conjunction with flexible coupling (14), form a passageway (18) into which one free end (20) of device (22) is placed from one side of oppositely positioned sleeve (12). The other free end (24) of device (22), or free end (24) of another device (26), is placed into passageway (18) in the other oppositely positioned sleeve (12). Oppositely positioned sleeves (12) are then rotated in opposite directions so as to wind, twist, and torque flexible coupling (14) around device (22) (device 26) thereby sealing them against contaminants and joining them to quick connect sealing and clamping device (10). Additionally, the twisting draws oppositely positioned sleeves (12) together where they are held in place by teeth (28) or locking device(s) (16). In a preferred embodiment, sealed chamber (30) is provided with extension (38) which is hollow so as to allow aerosol can (40) to be attached at spray nozzle (42). When spray nozzle (42) is depressed, lubricant from aerosol can (40) is introduced through extension (38) into sealed chamber (30). In the situation where device (22) is a sheathed cable (36), barrel end (32) and exposed cable (34) are open within the sealed chamber (30) to receive the lubricant under pressure. As a result, lubricant is forced between cable (34) and sheathed cable (36) and sheathed cable (36) is thereby lubricated.

20 Claims, 2 Drawing Sheets

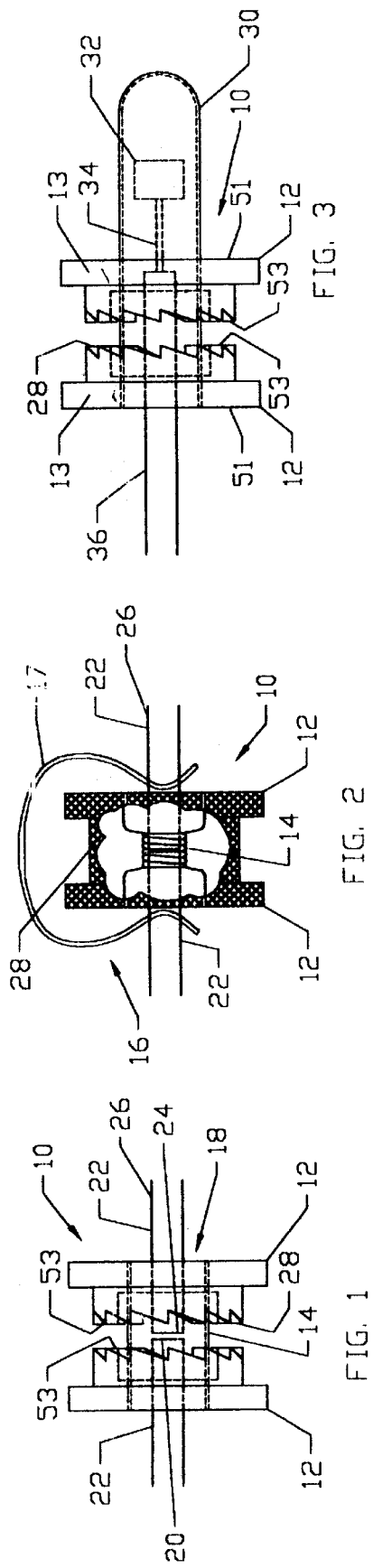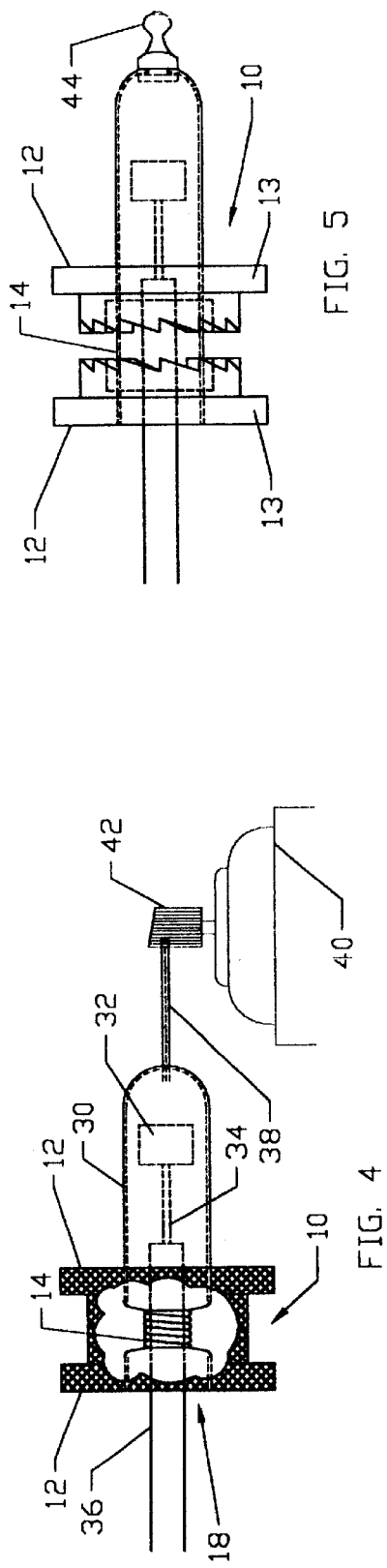

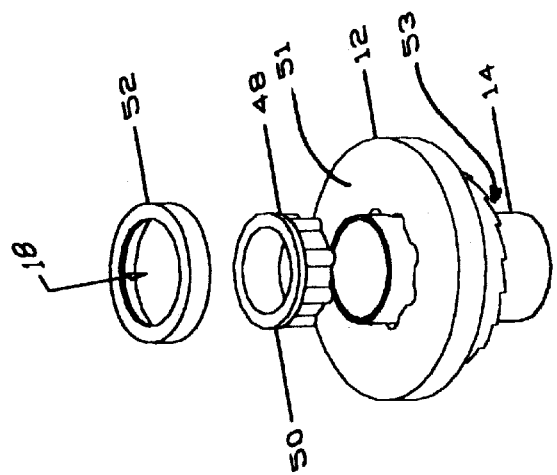
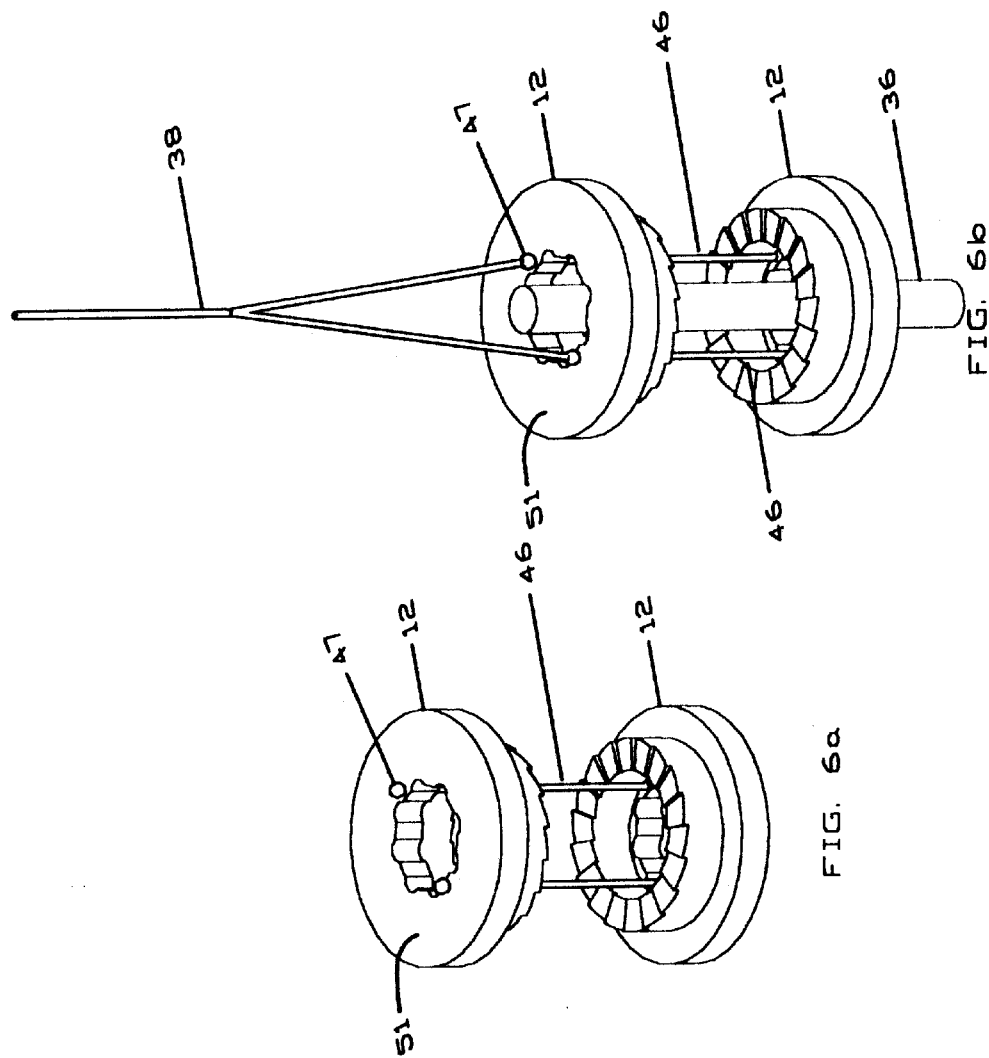

QUICK CONNECT SEALING AND CLAMPING APPARATUS AND METHOD

BACKGROUND OF THE INVENTION

This invention relates to a quick connect sealing and clamping apparatus and method for joining and sealing a device or devices.

In the course of a day, individuals encounter a high number, and a wide variety, of circumstances requiring the connection and sealing of loose ends. From the simple task of joining ends of twine together to adding a section of rope or cable to another section of rope or cable or joining different materials together. More industrial circumstances exist in which cable ends, pipes, tubes and the like must be towed or sealed quickly against the release, or introduction, of contaminants into or from the open end. Additionally, needs arise wherein sheathed cables cease to function efficiently for lack of lubrication and must be replaced. Schott, et al, U.S. Pat. No. 5,107,961 illustrates the state of the art for lubricating cables in the form of a metal clamp that compresses a rubber tube around the end of a cable. A valve aperture is provided for introducing lubricant into the clamp and then the cable.

A wide variety of other solutions have been devised for these problems, from the simple to the complex, from simply tying a knot in the loose end or tying the loose ends together or wrapping the exposed end in tape, for example.

A drawback to the solutions known in the art is that there is no single simple solution for all these connecting and sealing needs. Thus, there is a need in the art for providing a quick connect sealing device which is capable of quickly, efficiently, and inexpensively connecting two ends of material together, sealing and clamping those ends, and/or enabling lubrication of the ends of cables, tubes, pipes and the like. It, therefore, is an object of this invention to provide a quick connect sealing and clamping apparatus and method for quickly, efficiently, and inexpensively connecting and/or sealing opposite ends of a single device, such as wire, cable, rope, or the like, or free ends of multiple sections of materials and/or sealing open ends and enabling lubrication of the open end thereafter.

SHORT STATEMENT OF THE INVENTION

Accordingly, the quick connect sealing and clamping apparatus of the present invention includes a pair of oppositely positioned sleeves joined together by a flexible coupling. The free ends of a single device, or multiple devices, are inserted one in one sleeve and one or more other free ends in the other sleeve, extending into the space created by the interconnecting piece of flexible coupling. The oppositely positioned sleeves are then rotated so as to twist the interconnecting flexible coupling around the free ends of the device(s) to be joined. The twisting draws the oppositely positioned sleeves together and seals and connects the ends of the device(s) to be connected and sealed. Once sufficiently tightened, the oppositely positioned sleeves are locked together and the connection and sealing is complete. The sleeves include a locking device for holding the sleeves together once they have been attached to the device to be connected and/or sealed.

In a preferred embodiment a sealed chamber is connected to one of the oppositely positioned sleeves. In this embodiment, the free end of the device to be connected and sealed is inserted into the sleeve without the chamber and then into the chamber and the quick connect sealing device attached, thereby sealing the free end within the chamber. By means of an extension attached to the sealed chamber, the cable, or whatever device is being connected, clamped, and/or sealed, may be pulled by means of the quick connect sealing device.

In another preferred embodiment, the extension connected to the sealed chamber is hollow for receipt, transfer, and delivery of lubricant to the sealed chamber. A corresponding method for connecting, clamping and sealing devices is also provided as set forth hereafter.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 1 is a side view of a preferred embodiment of the quick connect sealing and clamping apparatus of the present invention with dotted lines showing the interior detail of the device;

FIG. 2 is a side view partially cut away of the quick connect sealing and clamping device in its closed or locked position;

FIG. 3 is a side view of the invention of FIG. 1 with a sealed chamber attached to one of the sleeves;

FIG. 4 is a side view of the present invention showing the oppositely positioned sleeves drawn together as the interconnecting flexible coupling is twisted around the cable and also showing a hollow extension attached to the sealed chamber for the introduction of lubricant by means of an aerosol container;

FIG. 5 is a side view of the invention with a zirc or grease fitting connected to the sealed chamber;

FIG. 6a is a side view of the invention wherein the flexible coupling consists of a number of wire strands and FIG. 6b shows the invention of FIG. 6a with an extension connected for use in pulling the cable; and FIG. 7 is an exploded view of a preferred embodiment of the manner of securing the flexible coupling to the sleeve.

DETAILED DESCRIPTION OF THE PREFERRED EMBODIMENTS

The preferred embodiment of the present invention is illustrated by way of example in FIGS. 1–7. With specific reference to FIGS. 1 and 2, quick connect sealing and clamping device 10 includes a pair of oppositely positioned sleeves 12 joined together and interconnected by flexible coupling 14. One or more locking devices 16 are also provided. Quick connect sealing device 10 forms a passageway 18 by means of holes through the center of oppositely positioned sleeves 12 and by the flexible coupling 14 connected to both sleeves 12.

As shown in FIG. 1, free end 20 of device 22 is inserted into passageway 18 through one of the oppositely positioned sleeves 12. Free end 24 (which could be the opposite end of device 22) of device 26 is inserted from the opposite end of passageway 18 through the other oppositely positioned sleeve 12.

Referring now to FIG. 2, quick connect sealing device 10 is shown connecting and sealing free end 20 and free end 24 as a result of twisting oppositely positioned sleeves 12 in opposite directions so as to twist flexible coupling 14 around free end 20 and free end 24. Locking device 16 is shown in the form of "C" clamp 17 in the secured position securing oppositely positioned sleeves 12 against being pulled apart.

As shown in FIGS. 1 and 2, oppositely positioned sleeves 12 have, in a preferred embodiment, teeth 28 formed in the facing sides 53 of the oppositely positioned sleeves 12. In operation, as oppositely positioned sleeves 12 are rotated in opposite directions, flexible coupling 14 is quickly and tightly twisted around and clamps free ends 20 and 24 of device 22 and/or 26, as well as drawing oppositely positioned sleeves 12 towards each other.

Flexible coupling 14 may be made of any medium known in the art, such as elastomer, rubber, silicon, coated cloth, or the like. Oppositely positioned sleeves 12 are formed of hard plastic, ceramic, metal or any other suitable material. Teeth 28 are formed in the hard material so that when drawn together by the wrapping of flexible coupling 14, the oppositely positioned sleeves 12 resist unloosening by way of the teeth 28 interlocking. Also, oppositely positioned sleeves 12 may be joined together once flexible coupling 14 is twisted around free ends 20 and 24 by locking device(s) 16, such as "C" clamp 17. In the preferred embodiment, again, flexible coupling 14 is made of a hollow flexible rubber tube and imparts, when twisted, a torque to oppositely positioned sleeves 12 which, again, is resisted by the teeth 28, when joined, thereby locking them in place and also by locking device(s) 16.

While FIGS. 1 and 2 show one device 22 and/or two devices 22 and 26, it is obvious that multiple strands of string, cable, and the like can be introduced into passageway 18 from both openings of oppositely positioned sleeves 12. In any event, by way of the quick connect sealing and clamping device 10, free end 20 and free end 24, or multiples thereof, may be quickly, inexpensively, rapidly and securely connected, sealed and/or clamped together.

Referring now to FIG. 3, another preferred embodiment of the invention is illustrated wherein one of the oppositely positioned sleeves 12 further includes a sealed chamber 30. Sealed chamber 30 is hollow and designed to receive free end 20 of device 22 which, as illustrated in FIG. 3, may be the attachment barrel end 32 of cable 34 of sheathed cable 36. In the embodiment, sheathed cable 36 with the open end at barrel end 32 and exposed cable 34 are fully sealed and protected against the introduction of contaminants by sealed chamber 30. This is useful for the prevention of the introduction of contaminants into the open, exposed, free end, when a sheathed cable 36 must be placed aside prior to use, repair or the like.

Referring now to FIG. 4, another preferred embodiment of the invention is illustrated wherein extension 38 is connected to sealed chamber 30. In this embodiment, extension 38 is a hollow tube for receipt, transfer, and delivery of a lubricant to the interior of sealed chamber 30. As shown in FIG. 4, a standard aerosol lubricant can 40 containing lubricating gas, fluid, oil or the like, is connected to one end of extension 38. When the aerosol can 40 is operated by depressing spray nozzle 42, lubricant passes from aerosol can 40 through hollow extension 38 into sealed chamber 30. By way of quick connect sealing and clamping device 10, lubricant from aerosol can 40 has no where to go except down cable 34 and inside sheathed cable 36 thereby effectively, quickly and inexpensively providing a means for lubricating sheathed cable 36.

FIG. 4 is also illustrative of the advantages of this embodiment of the invention in that locking device 16 is not necessarily required since teeth 28 in this embodiment are fully sufficient to resist the unwinding of flexible coupling 14 and keep quick connect sealing and clamping device 10 secured in its wrapped position around sheathed cable 36, since no forced pulling apart of oppositely positioned sleeves 12 is exerted in this embodiment.

Referring now to FIG. 5, extension 38 is shown in the form of a grease, or zirc, fitting 44, as they are commonly known. Obviously, grease fitting 44 is utilized when necessary to complement the lubricant to be delivered. Grease fitting 44, as well as any and all extensions 38, may be attached to sealed chamber 30 by any means known in the art such as threaded connection, welding, gluing and the like.

FIGS. 6a and 6b also illustrate another preferred embodiment of the invention by way of another form of flexible coupling 14. FIG. 6a illustrates flexible coupling 14 in the form of multiple wire strands 46. As necessary and where appropriate, wire strands 46 are utilized when pulling tension on quick connect sealing and/or clamping device 10 is the objective for movement of sheathed cable 36 or the like. That is, multiple wire strands 46 serve to greatly enhance the gripping effect when twisted around an object such as sheathed cable 36. Referring now to FIG. 6b, another preferred embodiment of the invention is illustrated by way of illustrating extension 38 in the form of an inverse "Y" extension 38 connected to two ends 47 of wire strands 46 designed for pulling on quick connect sealing and clamping device 10 and thereby on sheathed cable 36. In a preferred embodiment, the ends 47 of wire strands 46 pass through oppositely positioned sleeves 12 and are secured on the exterior face 51. Because extension 38 is connected to the ends 47 of wire strands 46, any pulling force will tend to tighten the grip of wire strands 46. In this embodiment, a locking device 16 (see FIG. 2) may also be used as an additional locking mechanism for preventing oppositely positioned sleeves 12 from separating from each other when tension is placed on extension 38.

Referring now to FIG. 7, an exploded side, section view of a preferred embodiment of the quick connect sealing and clamping device 10 is shown illustrating how flexible coupling 14 is held within the ends of oppositely positioned sleeves 12. Flexible coupling 14 is placed within one of the oppositely positioned sleeves 12. Then flexible coupling expander 48 is inserted into flexible coupling 14 expanding flexible coupling 14 into secure engagement with oppositely positioned sleeve 12. Flexible coupling expander 48 has a lip 50 which engages the exterior face 51 of oppositely positioned sleeve 12 and prevents flexible coupling expander 48 from passing completely through oppositely positioned sleeve 12. Once flexible coupling expander 48 is in place, retainer 52 is securely attached to the exterior face 51 of oppositely positioned sleeve 12 thereby preventing flexible coupling expander 48 from being forced out of engagement with oppositely positioned sleeve 12. Both flexible coupling expander 48 and retainer 52 have a passageway 18 that is equal to the passageway 18 formed by flexible coupling 14 and sleeves 12.

Other preferred embodiments for retaining flexible coupling 14 in place are epoxy, bonding cement, glue, welding, screws and any other efficient means known in the art.

After assembling the quick connect sealing device 10 of the present invention, in accordance with the information provided with regard to FIG. 7 and in any other manner known in the art, the use of the quick connect sealing device 10 is accomplished in the following manner. In the instance where the free ends of a single device 22 with one free end 20 and one free end 24 are desired to be joined together, the preferred embodiment of the invention as illustrated in FIGS. 1 and 2 is utilized. In that instance, free end 20 and free end 24 are inserted into passageway 18 from opposite sides of oppositely positioned sleeves 12. Once within passageway 18, oppositely positioned sleeves 12 are rotated in opposite directions thereby twisting flexible coupling 14 securely, snugly, sealingly and clampingly around device 22 and both free ends 20 and 24.

As oppositely positioned sleeves 12 are twisted, in opposite directions, the winding of flexible coupling 14 draws oppositely positioned sleeves 12 toward each other. As previously discussed, teeth 28 in the facing sides 53 of oppositely positioned sleeves 12 are designed to interlock as oppositely positioned sleeves 12 are drawn together by twisting. Torque is developed by the tension in flexible coupling 14 and its natural tendency to resist the twisting, wrapping motion. This is particularly true in the case where flexible coupling 14 is made of a resilient flexible material such as, for example, a hollow rubber tubing such as a bicycle tire tube or a normal flexible rubber tube of any shape or design. Other flexible resilient material of any known kind or hereafter developed can be utilized as well. The point is, teeth 28 resist the counter-rotation of energy exerted by twisted flexible coupling 14. Where there is no longitudinal stress along device 22 from either direction or on oppositely positioned sleeves 12, no other locking mechanism 16 is necessary. Nonetheless, to guard against any unintentional unlocking or in the case where longitudinal stress is to be applied to device 22 and thereby oppositely positioned sleeves 12, locking device(s) 16 may be used. Locking device(s) 16 is in any form known in the art such as a "C" clamp 17. When oppositely positioned sleeves 12 are snugly drawn together, "C" clamp 17 is connected over raised edges 13 of oppositely positioned sleeves 12 (see FIG. 3) thereby preventing any longitudinal movement away from each other or separation of oppositely positioned sleeves 12 in any way. One or more locking device(s) 16 may be utilized. Further, any locking device known in the art such as snaps, buckles, or any other releasably engageable locking device known or hereafter developed may be used.

Where a single device 22 is to be joined to itself so as to connect free end 20 and free end 24 and make a loop, quick connect sealing and clamping device 10, as utilized as just described, is all that is necessary to do so (see FIGS. 1 and 2). In the instance where another device 26 is desired to be joined to device 22, the operation is accomplished as previously described with single device 22. Obviously, any number of devices 22 and 26 may be joined together. The only limitation is the size of the passageway 18 which, of course, is irrelevant to the invention in that it is only necessary for it to be of a size to accommodate the device(s) to be connected. That is, very small quick connect sealing and clamping devices 10 may be utilized for joining string, twine, rope and the like together for wrapping and other purposes or large quick connect sealing and clamping devices 10 may be utilized for joining large cables, pipes and the like together or for sealing the free ends of cables, pipes and the like.

In the preferred embodiment of the invention, the quick connect sealing and clamping device 10 of the present invention is utilized with a sealed chamber 30. By itself quick connect sealing and clamping device 10 with sealed chamber 30 can be used to seal the open ends of any device 22 such as a pipe, a sheathed cable, or anything where the open end is to be sealed, as against the introduction of contaminants, for example. Sealed chamber 30 may simply be formed from an extension of flexible coupling 14 and therefore does not necessarily have to be "added on".

The addition of an extension 38 attached to sealed chamber 30 enables other quick connect sealing and clamping solutions as well. With reference to FIG. 4, in particular, in the case where, for example, it is desired to lubricate automobile, bicycle, or other vehicle sheathed cables 34, quick connect sealing and clamping device 10 is extraordinarily efficient. In operation, the open end of oppositely positioned sleeves 12 is inserted over sheathed cable 36 so that barrel end 32 and cable 34 and some portion of sheathed cable 36 extend through passageway 18 and into sealed chamber 30. It should be noted that quick connect sealing and clamping device 10 can accommodate any cable end configuration, such as threads, screws, and the like, bypassing it and securing itself to the sheathed cable 36 thereafter. At that point, oppositely positioned sleeves 12 are twisted in opposite directions so as to make the seal by securing flexible coupling 14 around sheathed cable 36. Once tightly secured, aerosol can 40 can be brought to hollow extension 38 and, by depressing spray nozzle 42, spray lubricant, of any type known in the art, may be introduced to the sealed chamber 30. Because the lubricant is introduced to the sealed chamber 30 under pressure, the lubricant will find its way between the cable 34 and sheathed cable 36 thereby cleansing and lubricating cable 36 from barrel end 32 throughout the length of sheathed cable 36.

As illustrated in FIG. 5, any other kind of extension 38 may be used in conjunction with sealed chamber 30 such as a common zirc or grease fitting 44. Additionally, extension 38 may be a solid attachment so that once quick connect sealing and clamping device 10 is secured to device 22, attachment 38 can be used to pull device 22. As illustrated in FIGS. 6a and 6b, a preferred embodiment for use in this situation includes multiple wire strands 46 (two or more) which provide a flexible coupling of a very strong, sturdy, and secure type, the type necessary when applying longitudinal stress to pull device 22 by extension 38, for example. Further, oppositely positioned sleeves 12, in this embodiment may both be split longitudinally and hinged so as to allow quick connect sealing and clamping device 10 to reattach to the middle of a cable when the free end of the cable is not available or accessible. In this way, a split hose could be clamped around a cable and conformed to it so as to wipe it. Still further, oppositely positioned sleeves 12 have raised edges 13 useful for gripping while twisting. Raised edges 13 also serve as contact points should a split wedge need to be used to separate oppositely positioned sleeves 12 that have been so tightly drawn together that they resist hand manipulation.

While the quick connect sealing and clamping device 10 of the present invention has been disclosed in connection in particular with ropes, cables, pipes, and the like, it should be appreciated that the device can be used in other connecting, sealing, and clamping situations. It is not necessary, for example, that the device 22 to be joined be tubular in shape. Any regular or irregular shape may be accommodated by passageway 18 so long as sufficient flexible coupling 14 is provided to securely wrap, seal and/or clamp device 22. Thus, the quick connect sealing device 10 of the present invention could be utilized in sealing and/or clamping cartons, cans, glasses, bags, hoses, and any other device or object where the situation requires an efficient, inexpensive means for doing so.

While the present invention has been disclosed in connection with the preferred embodiment thereof, it should be understood that there may be other embodiments which fall within the spirit and scope of the invention as defined by the following claims.

What is claimed is:

1. A quick connect sealing and clamping apparatus comprising:

(a) a pair of oppositely positioned sleeves;

(b) said pair of oppositely positioned sleeves interconnected by a flexible coupling wherein said flexible coupling is sufficient to multiply wrap an object and draw said oppositely positioned sleeves towards each other as the oppositely positioned sleeves are twisted in opposite directions; and (c) a means for locking said pair of oppositely positioned sleeves together.

2. The apparatus of claim 1 further comprising a sealed chamber connected to one of said sleeves.

3. The apparatus of claim 2 further comprising an extension connected to said sealed chamber.

4. The apparatus of claim 3 wherein said extension is hollow for receipt, transfer, and delivery of lubricant to said sealed chamber.

5. The apparatus of claim 4 wherein said hollow delivery extension comprises a grease fitting.

6. The apparatus of claim 1 wherein said flexible coupling further comprises a flexible sheath.

7. The apparatus of claim 1 wherein said flexible coupling further comprises a plurality of wire strands.

8. The apparatus of claim 7 wherein an extension for pulling is connected to said wire strands.

9. The apparatus of claim 1 wherein said means for locking said pair of oppositely positioned sleeves together further comprises teeth formed in facing portions of said pair of oppositely positioned sleeves that interlock when drawn together.

10. A quick connect cable sealing, clamping and lubricating apparatus comprising:

(a) a pair of substantially identical oppositely positioned sleeves with teeth formed in facing portions of said sleeves;

(b) a flexible sheath interconnecting said pair of oppositely positioned sleeves wherein said flexible sheath is sufficient to multiply wrap around an object and draw said oppositely positioned sleeves towards each other as the oppositely positioned sleeves are twisted in opposite directions;

(c) a sealed chamber connected to one of said pair of oppositely positioned sleeves;

(d) a hollow extension connected to said sealed chamber for receipt, transfer and delivery of lubricant to said sealed chamber; and (e) a means for locking said oppositely positioned sleeves so that said teeth interlock and are held together.

11. The apparatus of claim 10 wherein said hollow extension comprises a grease fitting.

12. A quick connect sealing and clamping method comprising the steps of:

(a) providing a pair of oppositely positioned sleeves;

(b) interconnecting said pair of oppositely positioned sleeves with a flexible coupling said flexible coupling sufficient to multiply wrap around a device to be sealed and draw the oppositely positioned sleeves towards each other as the oppositely positioned sleeves are twisted in opposite directions;

(c) inserting one end of a first device to be connected into one sleeve and another end of the first device or a second device into the other sleeve;

(d) turning said pair of oppositely positioned sleeves so that said flexible coupling is twisted around and seals the ends of the first or second devices; and (e) locking said pair of oppositely positioned sleeves together once said flexible coupling is sealed against the first and/or second device.

13. A quick connect sealing and clamping method comprising the steps of:

(a) providing a pair of oppositely positioned sleeves;

(b) interconnecting said pair of oppositely positioned sleeves with a flexible coupling, said flexible coupling sufficient to multiply wrap around a device to be sealed and draw the oppositely positioned sleeves towards each other as the oppositely positioned sleeves are twisted in opposite directions;

(c) connecting a sealed chamber to one of said sleeves;

(d) sliding both pairs of oppositely positioned sleeves over an end of said device to be sealed;

(e) turning said pair of oppositely positioned sleeves so that said flexible coupling is twisted around and seals the device; and (f) locking said pair of oppositely positioned sleeves together once said flexible coupling is sealed against the device.

14. The method of claim 13 further comprising the step of attaching an extension to said sealed chamber.

15. The method of claim 14 wherein said step of attaching an extension further comprises providing a hollow extension for receipt, transfer and delivery of lubricant to said sealed chamber.

16. The method of claim 15 wherein the step of providing the extension comprises the step of providing a grease fitting.

17. The method of claim 13 wherein the step of providing a flexible coupling comprises the step of providing a flexible sheath.

18. The method of claim 13 wherein the step of providing a flexible coupling comprises the step of providing a plurality of wire strands.

19. The method claim 13 wherein the step of providing a means for locking said pair of oppositely positioned sleeves together further comprises forming teeth in facing portions of said pair of oppositely positioned sleeves that interlock when drawn together.

20. The method of claim 18 further comprises the step of attaching an extension for pulling said wire strands.

* * * * *